United States Patent [19]
Guschall et al.

[11] Patent Number: 5,908,165
[45] Date of Patent: Jun. 1, 1999

[54] PROCESS AND APPARATUS FOR REPROCESSING MIXED PLASTICS

[75] Inventors: Dietmar Guschall; Heiner Guschall, both of Hilchenbach; Axel Helmerth, Siegen; Jörg Himmel, Hilchenbach; Gerhard Fahrbach, Plankstadt; Heinz-Reiner Schnettler, Arnsberg, all of Germany

[73] Assignee: Der Gruene Punkt-Duales System Deutschland Aktiengesellschaft, Cologne, Germany

[21] Appl. No.: 08/849,736

[22] PCT Filed: Dec. 21, 1995

[86] PCT No.: PCT/DE95/01869
§ 371 Date: Jul. 2, 1997
§ 102(e) Date: Jul. 2, 1997

[87] PCT Pub. No.: WO96/20819
PCT Pub. Date: Jul. 11, 1996

[30] Foreign Application Priority Data

Jan. 5, 1995 [DE] Germany ............... 195 00 224

[51] Int. Cl.⁶ ............... B02C 19/00; B02C 23/08
[52] U.S. Cl. ............... 241/23; 241/24.18; 241/29; 241/65; 241/79.1; 241/DIG. 38
[58] Field of Search ............... 241/19, 23, 24.18, 241/27, 29, 65, 79.1, 152.2, DIG. 38

[56] References Cited

U.S. PATENT DOCUMENTS

| | | | |
|---|---|---|---|
| 3,668,077 | 6/1972 | Ban | 201/29 |
| 3,814,240 | 6/1974 | Laundrie. | |
| 4,077,847 | 3/1978 | Choi et al. | 201/21 |
| 5,110,055 | 5/1992 | Teeny | 241/15 |
| 5,183,212 | 2/1993 | Boo et al. | 241/17 |
| 5,390,860 | 2/1995 | Ali et al. | 241/20 |
| 5,397,066 | 3/1995 | Leitman et al. | 241/19 |

FOREIGN PATENT DOCUMENTS

| | | |
|---|---|---|
| 16 79 834 | 5/1971 | Germany. |
| 25 46 097 | 4/1977 | Germany. |
| A 26 11 980 | 9/1977 | Germany. |
| A 36 01 175 | 7/1987 | Germany. |
| A 43 25 948 | 1/1994 | Germany. |
| A 43 01 066 | 7/1994 | Germany. |
| A 7 604 096 | 10/1976 | Netherlands. |
| WO A 93 14915 | 8/1993 | WIPO. |

OTHER PUBLICATIONS

Karl O. Tiltmann, Recyclingpraxis Kunststoffe, Kapitel 7.2.2, pp. 12 to 14, "Der Abfallberater Fuer Industrie, Handel und Kommunen", Mar. 1994.

Primary Examiner—John M. Husar
Attorney, Agent, or Firm—Oblon, Spivak, McClelland, Maier & Neustadt, P.C.

[57] ABSTRACT

A process and apparatus for reprocessing mixed plastics, more particularly mixed plastics from household refuse. The material being reprocessed is shredded in a shredding stage, agglomerated in an agglomerator wherein volatile substances are sucked off by suction devices, and the agglomerated material is dried over a drying path. In order to reduce obstructive substances, such as paper and ash, the fine grain portion in particular of the plastics agglomerated is screened off. With the drying process it is possible to produce without wet processing steps which are high in energy consumption a plastics agglomerate of high quality which is suitable for industrial re-use.

37 Claims, 12 Drawing Sheets

PROCESS AND APPARATUS FOR REPROCESSING MIXED PLASTICS

BACKGROUND OF THE INVENTION

1. Field of the Invention

The invention relates to a process for reprocessing mixed plastics and to an apparatus for reprocessing mixed plastics.

2. Discussion of the Background

Reprocessing (recycling) mixed plastics, more particularly mixed plastics from household refuse, is becoming more and more important. Through legal guidelines great emphasis is placed on ensuring full recycling of plastics on the home market.

Various processes and apparatus are already known for reprocessing plastics.

German Offenlegungsschrift DE 41 25 164 A1 describes a plant for recycling waste material from plastics material, particularly from agriculture. This contains at least one machine for shredding the waste material which feeds a pre-washing machine for pre-washing the waste articles, a grinding machine for the shredded and prewashed waste and a second washing machine for washing the ground waste. Finally the waste articles are dried in a drying machine and an exsiccation machine.

DE 43 29 270 A1 describes a plant and process for separating shredded plastics of different chemical composition and different density. The plant is characterised in particular through a separating device having the structural design of a geometrical chamber with two oppositely aligned cone parts for producing a laminar fluid flow which makes the desired separation of the plastics possible.

DE 43 06 781 describes a process for reprocessing refuse mixtures which are rich in plastics wherein first the obstructive substances are sorted by hand and then the refuse mixture is shredded and separated by wind sifting into light material containing mainly plastics and heavy material containing mainly metal constituents. The plastics-rich light material is then sorted by means of a wet density sorter according to the density. The density sorting is thereby carried out in several successive stages with different separating fluids, preferably in sorting centrifuges.

The said processes have the drawback that as a result of the wet density sorting or washing processes the reprocessed plastics must first have to undergo expensive drying before it can be supplied for further use.

The moisture of a largely dehydrated ground plastics material clings mainly to its surface. The greater the specific surface of a material so the more moisture clings to it. This produces a corresponding increase in the expense required to dry the ground plastics material. Wet plastics reprocessing is therefore becoming increasingly uneconomic particularly as a result of the trend for thinner and thinner foil articles.

German Offenlegungsschrift DE 39 11 326 A1 describes a process for reprocessing refrigerator housings which consist of moulded plastics parts wherein the refrigerator housings are first shredded in a shredder stage and then the iron parts are removed from the shredded material. The shredded material is introduced into a grinding stage and there shredded to a particle size of less than 10 mm.

The particles of unfoamed plastics are then separated in a wind sifter stage from the particles of foamed plastics. The particles of foamed plastics are introduced into a vortex flow grinding stage and there ground to an end fineness of 0.1 to 1 mm. The ground particles are supplied from the vortex flow grinding stage into a cyclone stage from where the reprocessed foamed plastics is discharged.

This plant which works without wet reprocessing stages is used basically only to separate the foamed plastics from unfoamed plastics of refrigerator housings.

With the dry reprocessing of plastics mixtures, more particularly mixtures from household refuse containing many different sorts, there is the problem of reliably removing from the plastics to be reprocessed obstructive substances, such as paper and the ash which is formed during thermal treatment, in order to allow the effective reuse of the reprocessed material.

The mixed plastics balls from the household refuse collection contain the most varied types of plastics which are used worldwide for packagings. The plastics are connected to paper, ceramics, metals and other foreign matter. These must be removed during the course of reprocessing since they restrict the material usability of the plastics. Thus for example metal remains can lead to premature wear of extrusion machines.

SUMMARY OF THE INVENTION

The object of the invention is to provide a process and apparatus for reprocessing mixed plastics with which a plastics agglomerate of high quality can be produced using the least possible amount of energy.

This is achieved according to the invention on the one hand through a process according to claim 1 and on the other through an apparatus according to claim 30.

With the process according to the invention the material to be reprocessed is first shredded and cleared of its magnetic substances. According to the invention the shredded material is compacted in an agglomerator by pressing, or thermally agglomerated wherein volatile substances, such as eg steam, ash and paper are sucked off through a suction device. The agglomerated material is then dried and the agglomerated material screened.

The invention is based on the surprising knowledge that a plastics agglomerate of high quality can be produced with a low energy input by substantially sucking off volatile obstructive substances during agglomeration and then screening off in particular the fine grain portion of the agglomerated material.

By sucking off volatile substances during agglomeration a large part of the paper, steam and ash located in the plastics mixture is removed. The remains of these substances still present in the material being reprocessed can be removed practically completely according to a preferred embodiment of the invention by screening off the fine grain portion of the agglomerated material. If the screening off of the fine grain portion is combined with a drying stage for the agglomerated material it is possible with the process according to the invention to produce a plastics agglomerate whose residual moisture is clearly below one percent and which understeps the maximum limits of the ash value required for raw material use.

Overall the process according to the invention is characterised in that a plastics agglomerate of high quality is obtained from mixed plastics in a pure dry process with low energy consumption. Furthermore no waste water arises during the course of the process.

In a preferred embodiment of the process according to the invention in addition to the fine grain portion the coarse grain portion of the agglomerated material is also screened off. A plastics agglomerate is thereby produced whose particle size is in a certain predetermined range and which is therefore particularly well suited for further use.

Advantageously the material to be reprocessed is shredded with a cutting roller grinder (shredder). In order to increase the material throughput in the shredding stage several shredders can be operated in parallel.

A further increase in the material throughput can be achieved in that the material to be reprocessed is pre-shredded before it enters the shredder. After the pre-shredding those foreign particles can be sorted out which might damage the shredder blades and impair the functioning of the shredder. The pre-shredded material is preferably delivered onto the shredder with a filling mechanism in order to prevent the material to be reprocessed from dancing on the grinding shafts of the shredder.

In order to separate off the heavier weight foreign matter after the pre-shredding stage the plastics material can be supplied for example through a flap device whose mechanism is released in dependence on the weight pressing on same.

Magnetic substances can be removed from the pre-shredded material by a magnetic separator.

After shredding the material with a shredder or the like the material to be reprocessed is moved along preferably underneath an overhead belt magnet in order to sort out the magnetic substances.

In a preferred embodiment of the invention the shredded material is thermally dried in a rotary tube drier. Dirt and inert particles clinging to the material can be released through the continuous movement of the material during the drying process.

According to the invention it can further be proposed that particularly heavy plastics and other heavy foreign matter can be separated off from the material being reprocessed by means of wind sifting. The granular portion of the material being reprocessed is thereby preferably ejected from the wind sifter by a mechanical conveyor whilst to ease the load on the conveyor, foil parts and the like are guided through a wind channel from the wind sifter to the centre section of the mechanical conveyor.

In order to remove further inert substances (constituent parts which cannot be recycled together with the plastics) from the shredded material which is cleared of magnetic substances, it is possible according to the invention for the material being reprocessed to be transported by a vibration conveyor having a screen base (screen path).

In order to ensure a regular flow of material into the agglomerator it is advantageous if the material to be reprocessed is stored in a buffer silo prior to entry into the agglomerator and is thereby homogenized by circulating. This process step also helps to homogenize the end product which results after agglomeration.

During agglomeration the material to be reprocessed is preferably first melted in the agglomerator and then suddenly cooled (thermal agglomeration) whereby the volatile substances are drawn off.

In a preferred embodiment of the invention the agglomerated material is dried on a drying path to a certain predetermined residual dampness and the fine grain portion of the agglomerated material is screened off using a drum screen. The material to be reprocessed is thereby preferably dried to a residual dampness of less than 1%. In order to remove volatile substances, such as paper and ash as completely as possible from the agglomerated material the fine grain particles with a size of less than 1 mm to 2 mm, preferably less than 1.6 mm, are screened out of the agglomerated material using the drum screen.

The coarse grain particles of the agglomerated material are preferably screened off from the agglomerated material together with the flux using a rod screen. The coarse grain screen is preferably designed so that grains having a size of more than 20 mm are removed from the agglomerated material.

In order to obtain an agglomerate with the most uniform possible particle size for recycling, the oversized grain part of the material remaining in the process, more particularly grains with a particle size of more than 8 mm, can be screened off and reshredded using a grinder.

Furthermore it is advantageous if the non-magnetic metals (non-ferrous metal) are separated out from the agglomerated material by a vortex flow separator.

A preferred embodiment of the process according to the invention is characterised as a whole by the following steps:

a) Shredding the material, preferably with a shredder;

b) Separating off magnetic materials, preferably with an overhead belt magnet;

c) Thermal drying of the material to be reprocessed, preferably using a rotary tube dryer;

d) Sorting out the fine grain particles, preferably using a drum screen;

e) Separating off heavy material, preferably with wind sifting;

f) Renewed screening of fine-particled material, preferably on a screen path;

g) Homogenizing the material to be reprocessed, preferably in a buffer silo;

h) Agglomerating the material to be reprocessed in an agglomerator with suction devices for the volatile substances;

i) Drying the agglomerated material, preferably on a drying path;

j) Screening off the fine grain particles, preferably with a drum screen;

k) Screening off coarse grain particles and flux, preferably with a rod screen;

l) Separating off non-magnetic materials, preferably with a vortex separator;

m) Screening off oversized grain particles of the material remaining in the process, more particularly particles with a granular size of more than 8 mm, and shredding up these particles, preferably with a grinder.

With the process according to the invention the substances removed from the material being reprocessed, more particularly the magnetic and non-magnetic metals, inert substances, heavy plastics and the screened fine and coarse grain particles are each preferably stored separately for further exploitation.

In order to optimize the material throughput with the process according to the invention it is possible that the material being reprocessed runs through several wind sifters and/or screening paths in parallel wherein the material being reprocessed is distributed to the various wind sifters and/or screen paths by means of a distributing and metering conveyor.

From the environmental protection and energy saving points of view it is proposed that the energy required for operating the reprocessing plant, more particularly the energy required for drying, is produced through power and heat coupling.

The agglomerate reprocessed with the above described process according to the invention can on the one hand be used industrially as a replacement for primary fuels. On the other hand a material recycling is possible. In particular new multi-functional structural elements can be manufactured from the recycling agglomerate, eg light structural elements for different uses in landscape and hydraulic engineering, for communications systems or different protective functions. They can also be used for planted sound protection walls as well as for dike and bank reinforcements or a non-sealed ecological parking area. The double environmental advantage of this structural element: Even after long term use it does not become waste but is supplied to the manufacturer again for material recycling.

An apparatus for reprocessing mixed plastics with which in particular the process according to the invention can be carried out is characterised by the features of independent claim 30.

The apparatus according to the invention has according to its characterizing features, more particularly an agglomerator for agglomerating the shredded plastics mixture, suction devices for sucking off the volatile substances during agglomeration, a drying path for the agglomerated material and a fine grain screen for screening off the fine grain particles of the agglomerated material.

The apparatus according to the invention allows the reprocessing of mixed plastics in a pure dry process. Using the suction devices during the agglomeration a large part of the volatile substances which would reduce the quality of the plastics agglomerate, such as eg steam, ash and paper, are sucked off. The residual moisture is further reduced on a drying path. Finally with the fine grain screen the fine grain portion of the agglomerate is screened off which contains the widely predominant part of the volatile substances remaining in the agglomerate, such as eg paper and ash.

By means of the apparatus according to the invention it is thus possible to produce without using a wet process for sorting and cleaning the plastics a plastics agglomerate whose ash and paper content is below the maximum limits demanded and which has at the same time without expensive drying apparatus an extremely low residual moisture content of less than one percent. This result is achieved with mixed plastics such as are normally found in household refuse etc. No restrictions need be placed on the wide variety of plastics to be reprocessed.

Further advantageous designs of the apparatus according to the invention are apparent from the sub-claims which are dependent on claim 30.

Further advantages of the invention will become clear from the following detailed description of two embodiments of the process according to the invention and one embodiment of the apparatus according to the invention with reference to the drawings in which:

FIG. 1a shows a summary or an embodiment of the process according to the invention using a ten-step flow chart. Individual steps of this process, namely the pre-shredding, material preparation of the first stage, material preparation of the second stage and material processing are then explained in further detail with reference to FIGS. 1b to 1e.

Figure 1A:
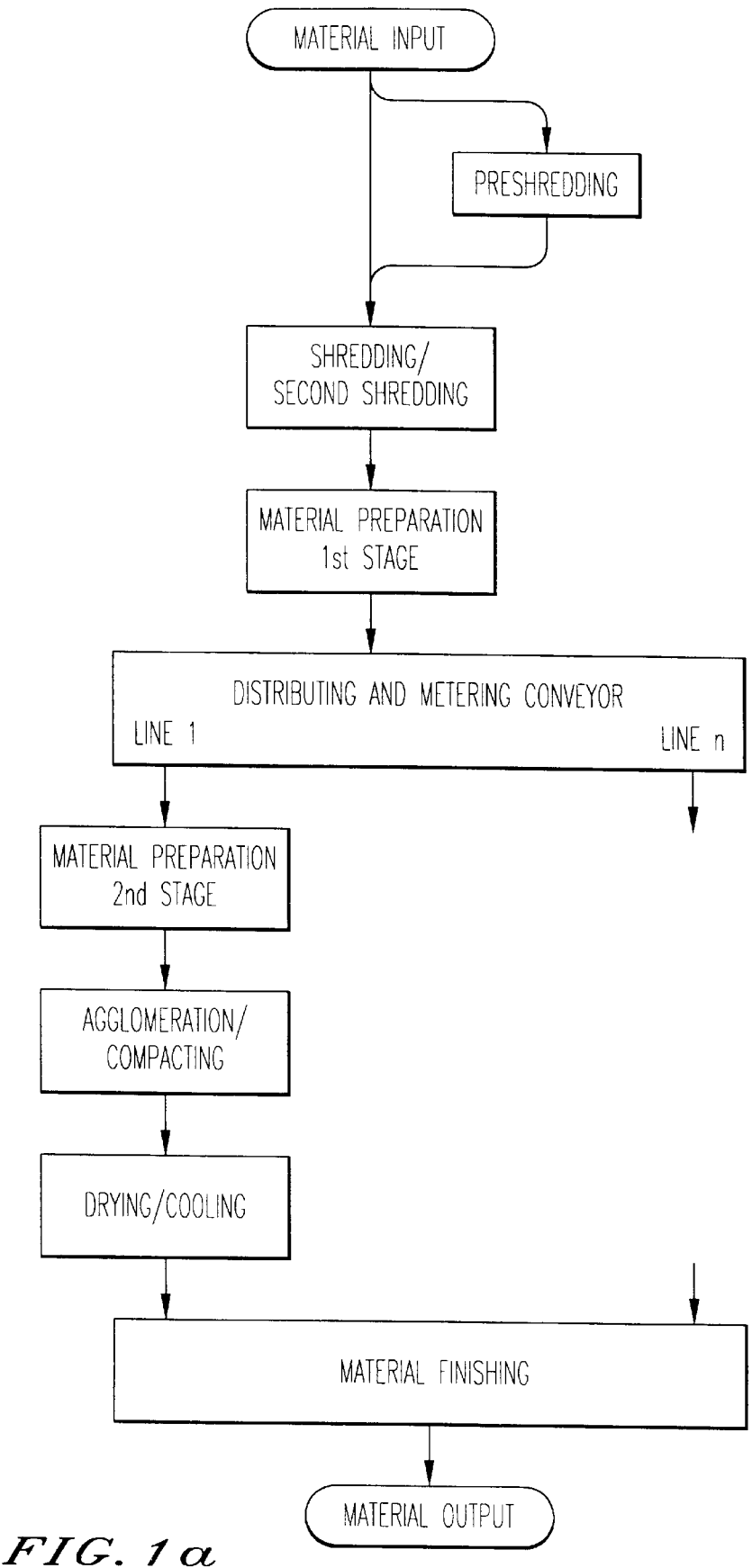
FIGS. 1a–1e show an embodiment of the process according to the invention using flow charts.

At the material inlet the mixture of plastics and refuse is first separated for example by releasing the refuse found in the plastics sacks. Depending on the properties of the plastics refuse this is either first pre-shredded or supplied directly into the actual shredding stage.

The pre-shredding of the refuse mixture is particularly necessary when the plastics refuse contains numerous foreign parts which could damage the cutter blades of the shredding device. Suitable for pre-shredding is for example a guillotine cutter with a robust blade which cuts up the incoming plastics balls into smaller parts. Sorting devices are then used to remove from the separated material those substances which could cause damage in the following shredding stage. The wear on the shredding device is thereby minimized. At the same time the material throughput is optimized since the pre-shredded material can be cut up better in the shredding stage.

The refuse mixture which is freed of obstructive substances is shredded for example by a shredder. The shredded material is then moved into the first stage of the material preparation for agglomeration. In this preparation stage in the first instance magnetic materials are separated off and the material is subjected to a first drying (pre-drying) Furthermore by screening off the fine particles inert substances are removed which cannot be further processed together with the plastics.

From the first stage of the material processing the material to be reprocessed is transported by a distributing and metering conveyor into different parallel branches of the plastics reprocessing apparatus. Each of these branches comprises a second stage of material preparation, a device for compacting and agglomerating the material as well as a drying device.

In the material preparation of the second stage heavy particles and inert substances are removed from the material to be reprocessed and the material to be reprocessed is then homogenized in an intermediate store (buffer silo).

The material refined in the material preparation stages 1 and 2 is then compacted (press-agglomerated) in an agglomerator by pressing or is thermally agglomerated by melting and sudden cooling; the aim is to produce a gravel type loose pile. During agglomeration volatile substances, such as eg paper, ash and steam are continually sucked off. Such substances which would impede further exploitation of the agglomerate or even render same impossible are thereby substantially removed. The agglomerated material is then dried in a drying stage to the desired residual dampness (normally less than 1%).

The material compacted and dried in the different branches of the reprocessing apparatus is then supplied for material finishing.

Material finishing is used finally to refine the agglomerated material so that it can be re-used industrially. To this end first the fine grain particles, preferably granules with a particle size of less than 1.6 mm, are screened off from the agglomerated and dried material. It was determined from experiments that the major proportion of the volatile substances still remaining, such as paper and ash, is contained in the fine grain part having a particle size of less than 1.6 mm. Therefore by screening off the fine grain particles the concentrations of ash and paper in the plastics agglomerate can be kept below the maximum limits which are required for the raw material use of the material.

The coarse grain particles, more particularly particles with a granular size of more than 20 mm are then screened off from the plastics agglomerate in order to obtain the most uniform possible loose pile. The material remaining in the process is freed of non-magnetic metals and shredded up again where necessary.

The finished agglomerated material is then stored in a storage silo until it is supplied for further use.

The processing steps pre-shredding, material preparation of the first stage, material preparation of the second stage and material finishing will now be explained in detail with reference to FIGS. 1b to 1e.

Figure 1B:
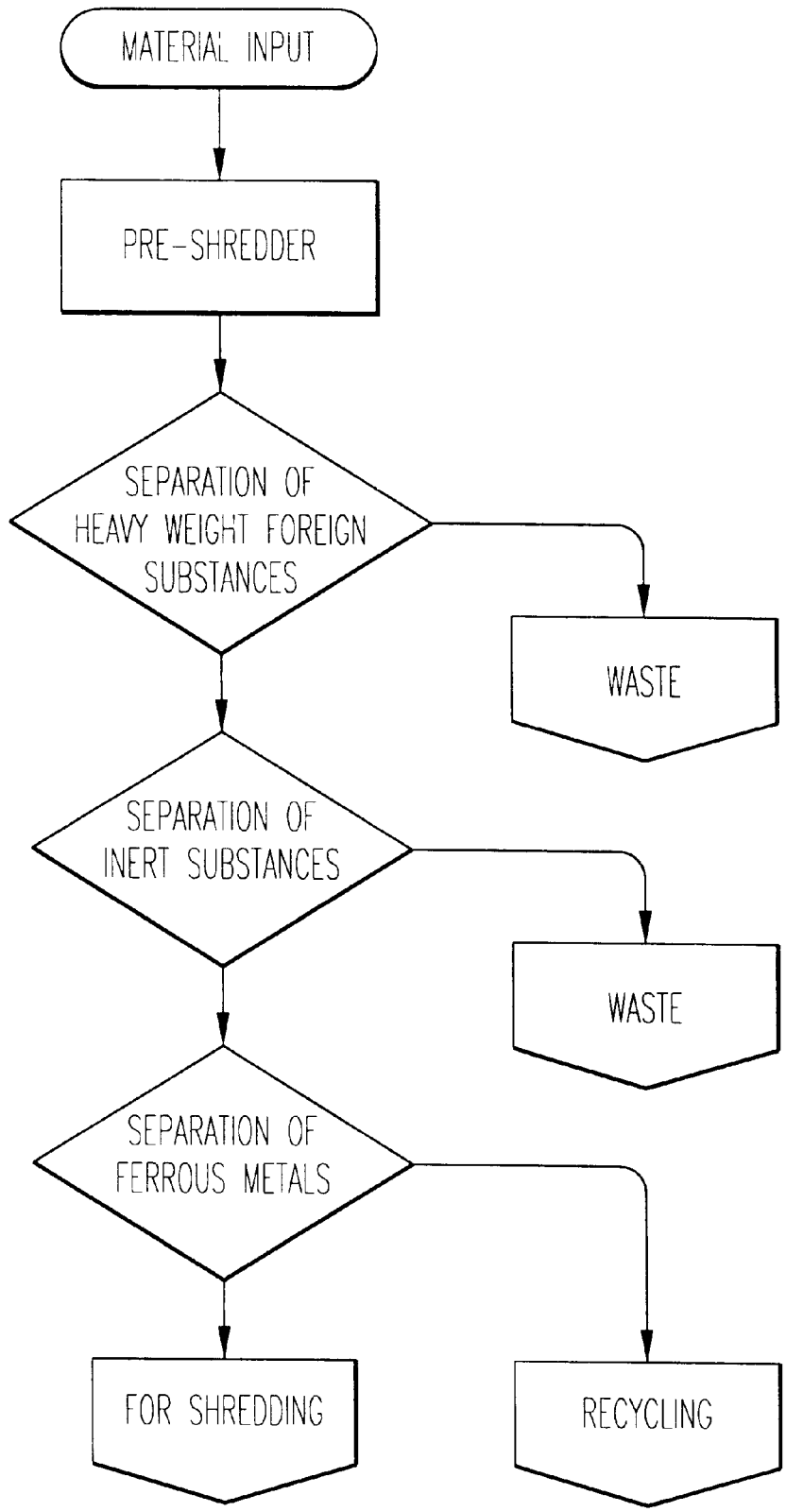

FIG. 1b shows a flow chart for pre-shredding the plastics mixture. The plastics balls supplied are preferably pre-shredded with guillotine shears or a comparable assembly for coarse shredding. The pre-shredded material is supplied over a flap which is released in dependence on the weight bearing on same. In this way foreign substances with a high weight are removed from the refuse mixture. Then by screening off the fine grain particles from the plastics mixture those inert substances are removed which cannot be recycled together with the plastics and for example would burn during thermal treatment in an agglomerator to form ash. Finally magnetic materials are separated off using a magnetic separator.

The material pre-shredded and cleared of obstructive substances in this way can be efficiently retreated in the actual shredding stage. If the second shredding is carried out for example by a shredder then by pre-treating the material in the manner described above damage to the shredder blades is prevented and the service life of the shredder is increased. At the same time this can chop up the pre-shredded material more effectively.

Figure 1C:
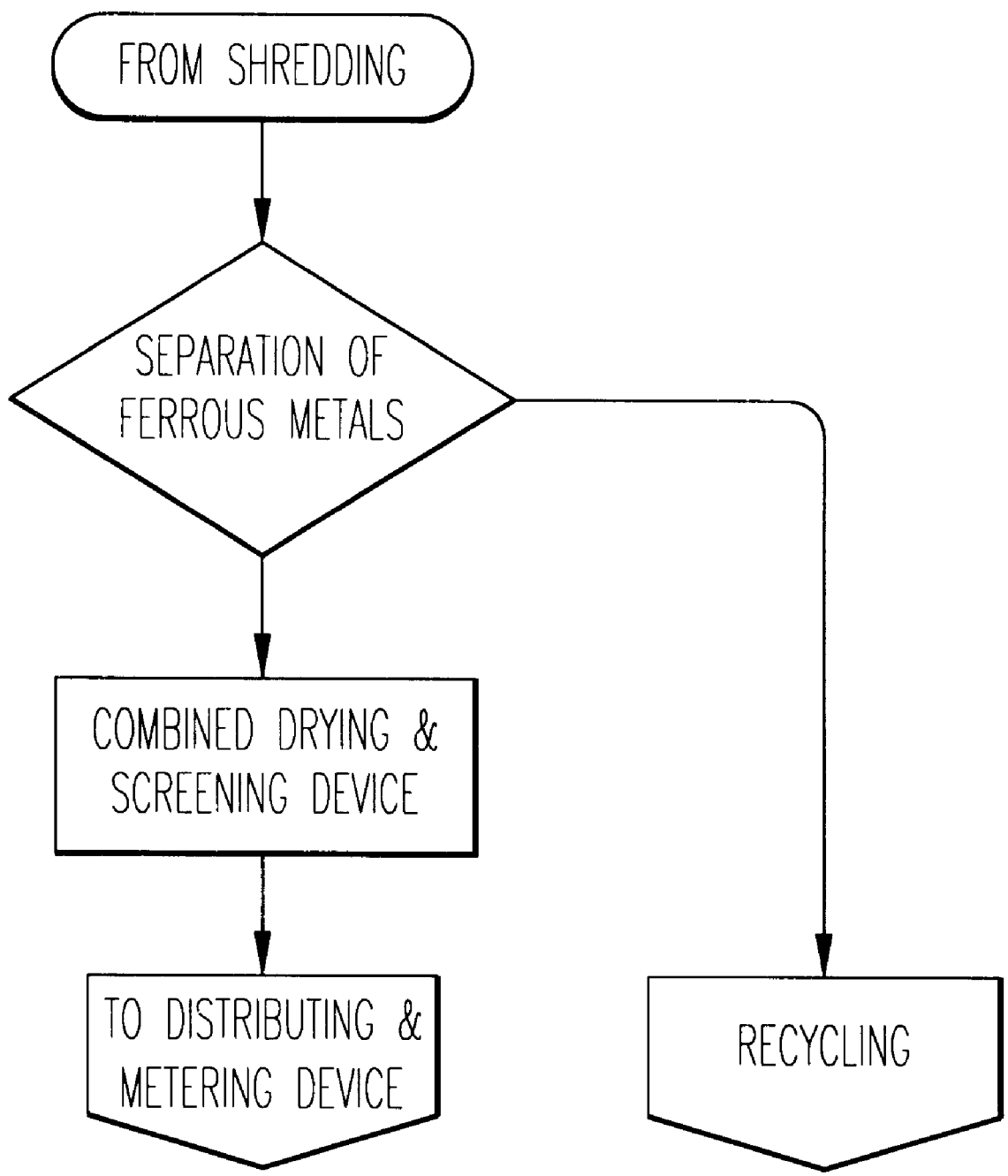

FIG. 1c shows how the shredded material is prepared in a first stage for agglomeration. For this, first the magnetic metals are removed from the material being reprocessed using a magnetic separator. These metals are supplied together with the magnetic metals separated during pre-shredding for separate recycling.

The material is then thermally dried in a rotary tube drier. Since the material being reprocessed moves around during drying adhering dirt and inert particles can be released from same. The rotary drier is more advantageously designed as a drum screen (rolling screen) so that the dirt and inert particles released during drying are screened off. Thus the concentration of particles which during thermal treatment (eg during agglomeration) of the material being reprocessed contribute to the formation of ash, is reduced.

Figure 1D:
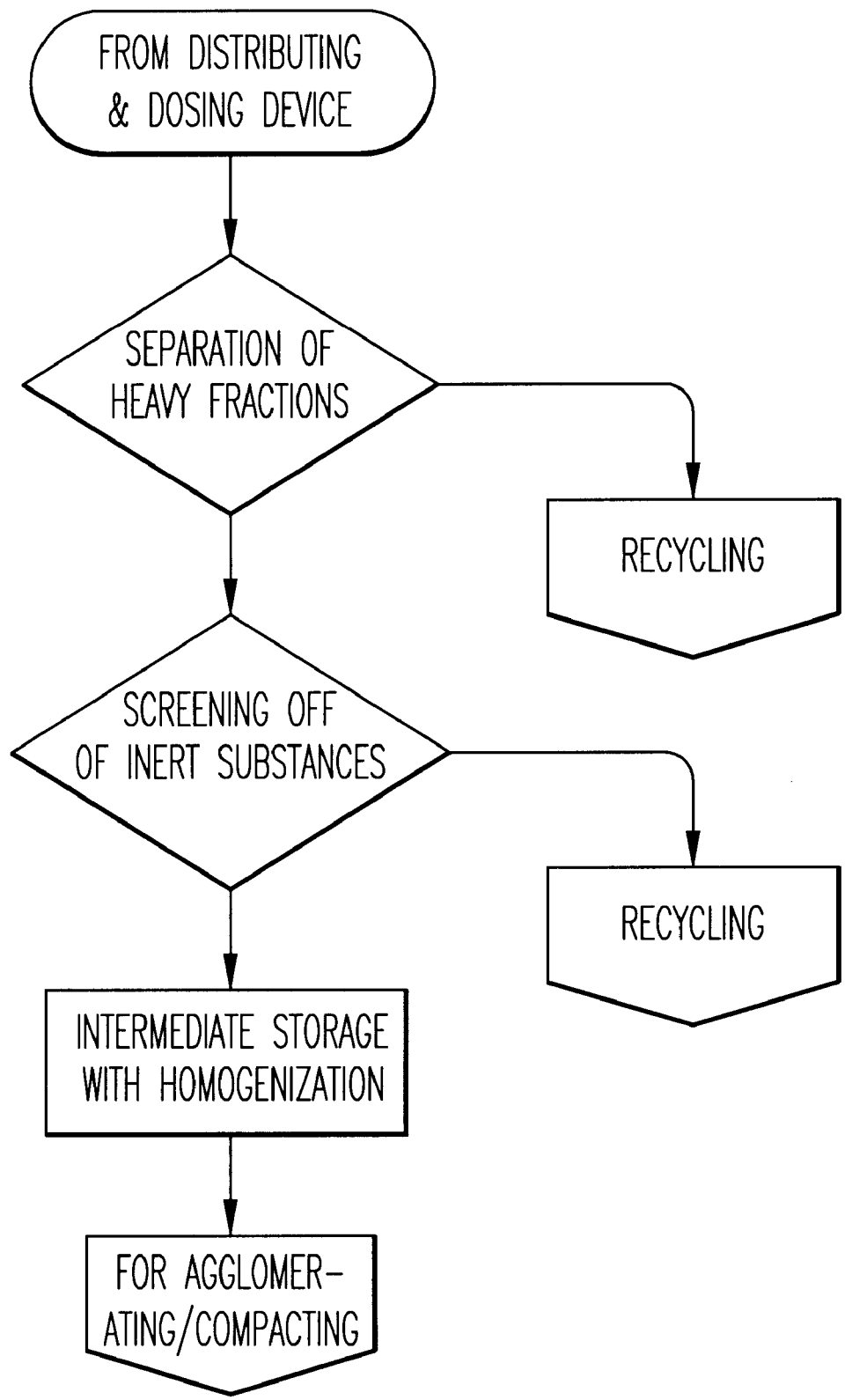

The second stage of the material preparation for agglomeration is shown in the flow chart according to FIG. 1d. The material to be prepared is introduced by a distributing and metering conveyor (cf FIG. 1a) into (one of several parallel-connected) wind sifter stages (flow classifier). Heavy plastics in particular such as eg PVC are separated in the wind sifter from the material to be reprocessed. These substances are then supplied separately for further recycling. In the wind sifter heavy foreign substances are also separated from the material being reprocessed which were not seized by the magnetic separator. Furthermore the lightweight plastics which are to be further processed are guided over a screen path on which further inert substances are screened off. This screen path can be for example a vibrating conveyor with screen base. Alternatively the material to be reprocessed can be directed over a solid screen rack. The inert substances thereby accumulate in the lower reach of the screen. The size of the screen opening is preferably selected so that grains with a particle size of less than 5 mm are screened off from the material to be reprocessed.

As far as possible the screened off inert substances are also passed on for separate recycling.

The material being reprocessed and freed of the heavy plastics and inert substances is temporarily stored in a buffer silo. The material to be reprocessed is homogenized in the buffer silo by circulating round. If necessary it can also be further dried there. Furthermore the buffer silo serves to control the material flow into the agglomerator.

The material homogenized in the buffer silo is—as described above—agglomerated in the agglomerator by sucking off volatile substances. A thermal drying is carried out in a drying stage (see FIG. 1a).

Figure 1E:
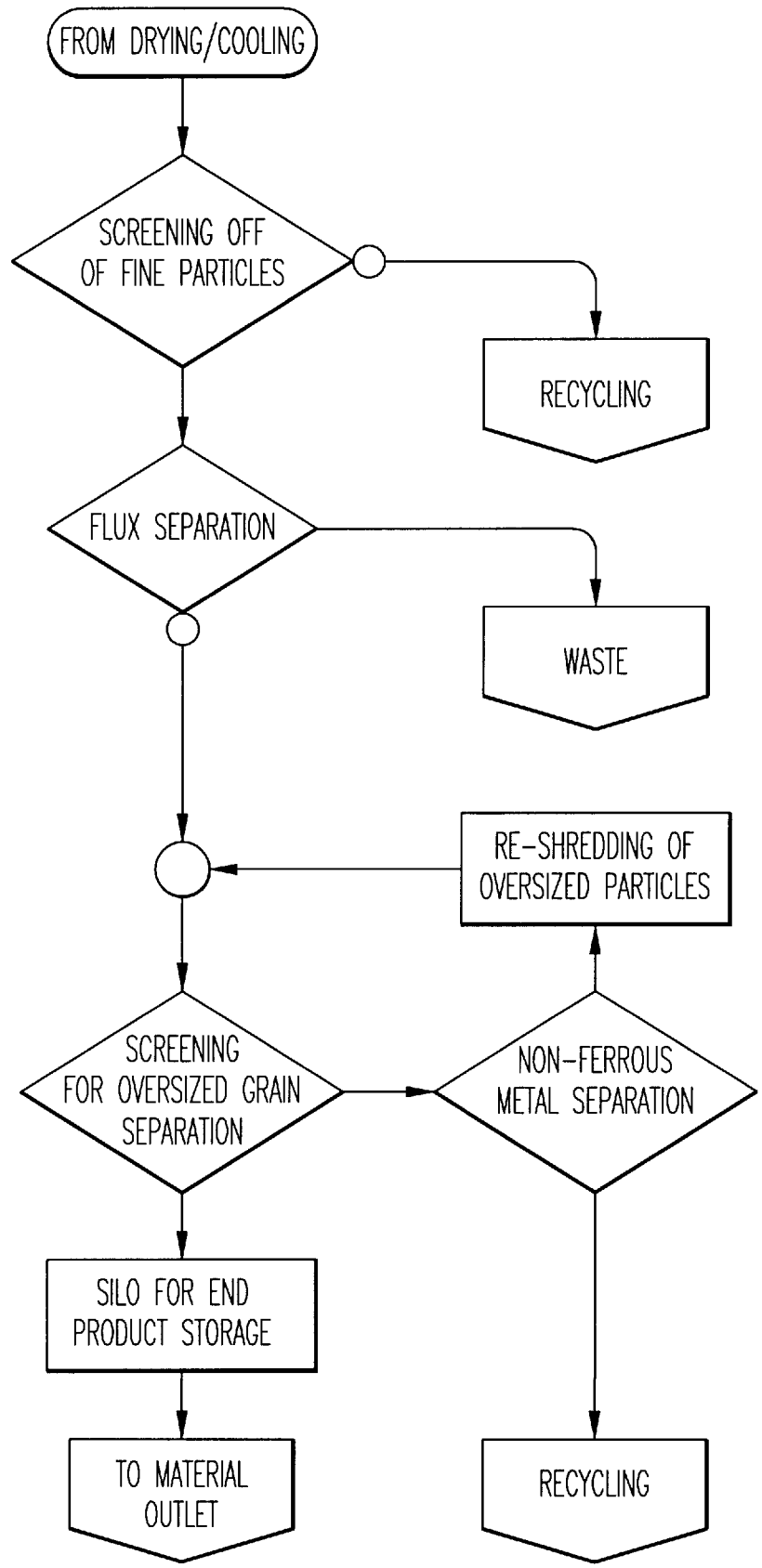

Of special significance to the invention is also the further material finishing following compacting and drying. This material finishing is shown in FIG. 1e.

First the fine particles, more particularly all granular particles with a size of less than 1.6 mm are screened off from the material which has agglomerated through melting and sudden cooling and then dried. A drum screen is preferably used for this. However magnetic screening machines can also be considered. Experimental investigations have shown that when screening off the fine particles those volatile substances such as eg ash and paper which could not be sucked off during agglomeration can also be removed from the material to be reprocessed. It is thereby possible with the process according to the invention to produce without a wet cleaning stage a plastics agglomerate with a very high quality and a lower concentration of ash and paper.

The screened off fine particles of the material to be reprocessed can where applicable also be supplied for separate recycling.

After passing a flux and coarse particle separation stage which can consist for example of a rod screen, with which particles of more than 20 mm are removed from the material to be reprocessed, the material being reprocessed is screened once more to sort out the oversized particles. First the non-magnetic metals are removed from the separated oversized particles (eg particles of more than 8 mm). A vortex flow separation is preferably used for this. With this the non-magnetic (paramagnetic) metals such as eg copper, aluminium and brass can be reliably separated off from the oversized particles of the plastics. The oversized grain particles freed of the metal obstructive substances are then shredded up again (for example with a grinder) and passed once more into the screening stage for oversized particle separation.

Separate recycling is provided for the non-magnetic metals which are separated out. Furthermore sorting out the non-magnetic metals can also take place between the fine grain screening and oversized particle separation eg directly after the flux separation stage.

After passing the screening stage for separating off oversized particles the agglomerated material is finally transported into a silo for end product storage. In this silo the agglomerate can where necessary be further homogenized by circulating round. At the same time the formation of bridges in the agglomerate is prevented by the mechanical circulation. The agglomerate is discharged from this silo when required and can then be industrially re-used.

Figure 2A:
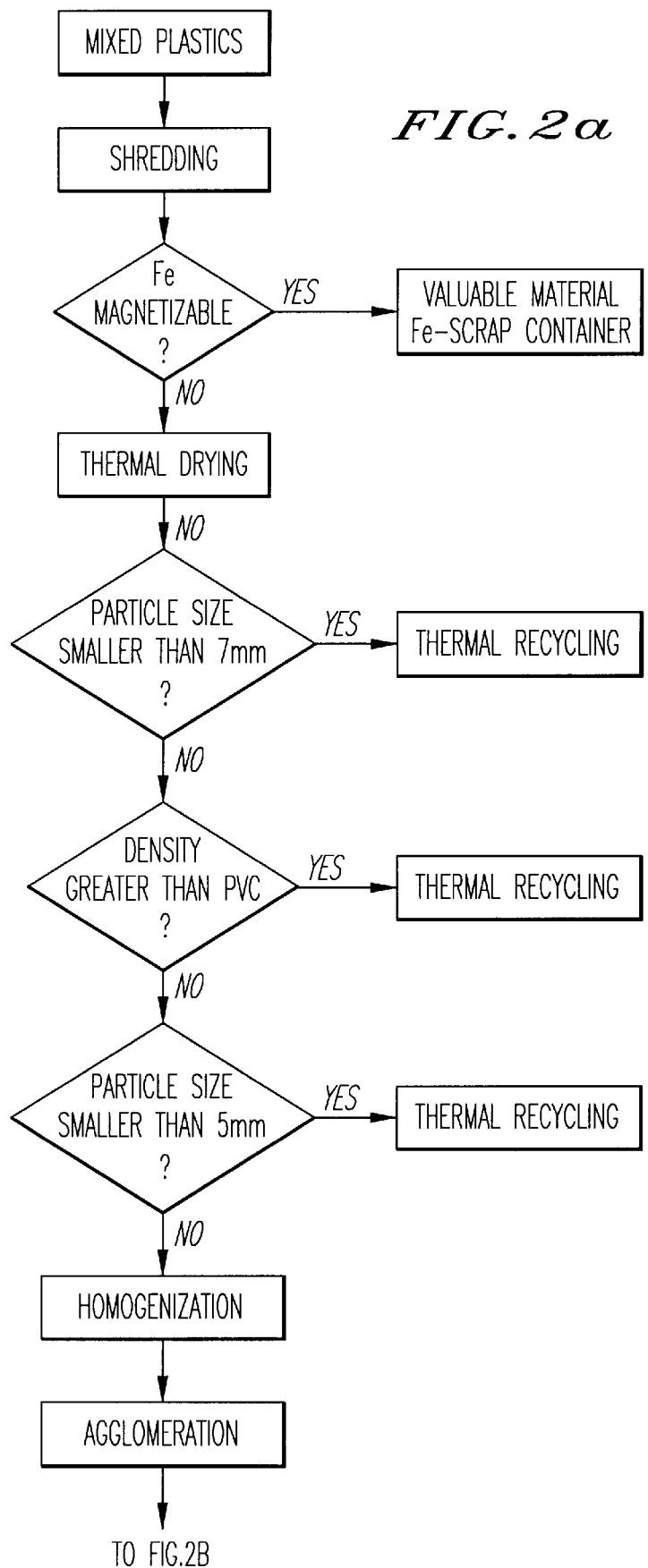
FIG. 2 shows a second embodiment of the process according to the invention using a flow chart.
Figure 2B:
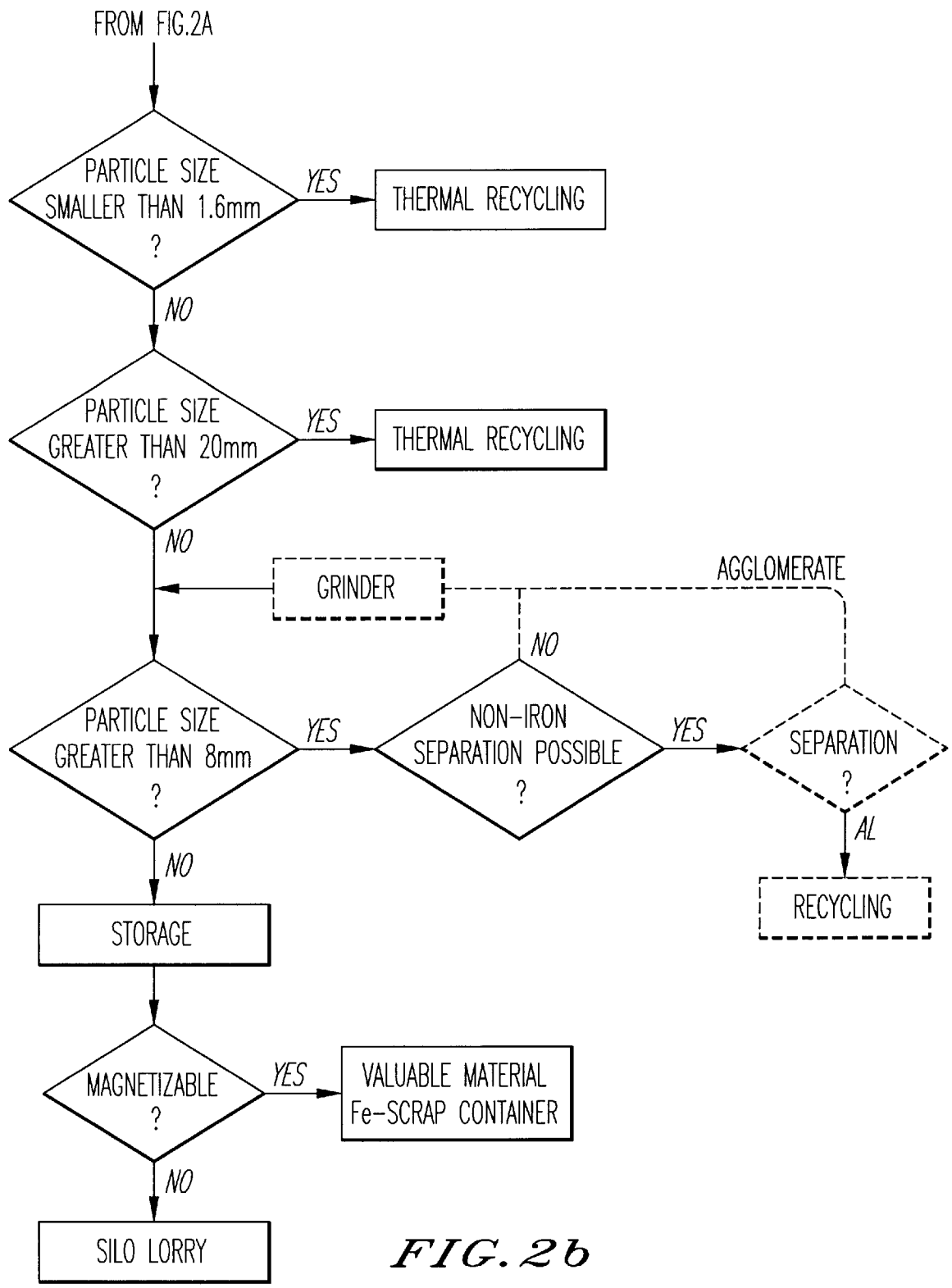

Another embodiment of the process according to the invention is shown in FIG. 2 using a further flow chart.

With this embodiment the mixed plastics refuse is reprocessed in the following steps:

a) Shredding the material which is to be processed;
b) Separating off magnetic materials (in particular ferro-magnetic materials);

c) Thermal drying of the material to be reprocessed, d) Screening off the fine grain particles with a particle size of less than 7 mm;

e) Separating off heavy fractions having a density greater than PVC;

f) Screening off fine-particled material having a particle size of less than 5 mm;

g) Storing and homogenizing the material in a buffer silo;

h) Agglomerating the material to be reprocessed;

i) Thermal drying of the material;

j) Screening off the fine grain particles having a particle size of less than 1.6 mm;

k) Screening off coarse grain particles having a particle size of more than 20 mm;

l) Separating off the particles having a particle size of more than 8 mm; separating off non-magnetic materials from the screened material; shredding screened-off material with a grinder and returning screened-off material into material reprocessing plant;

m) Storage of reprocessed material in a storage silo.

Figure 3A:
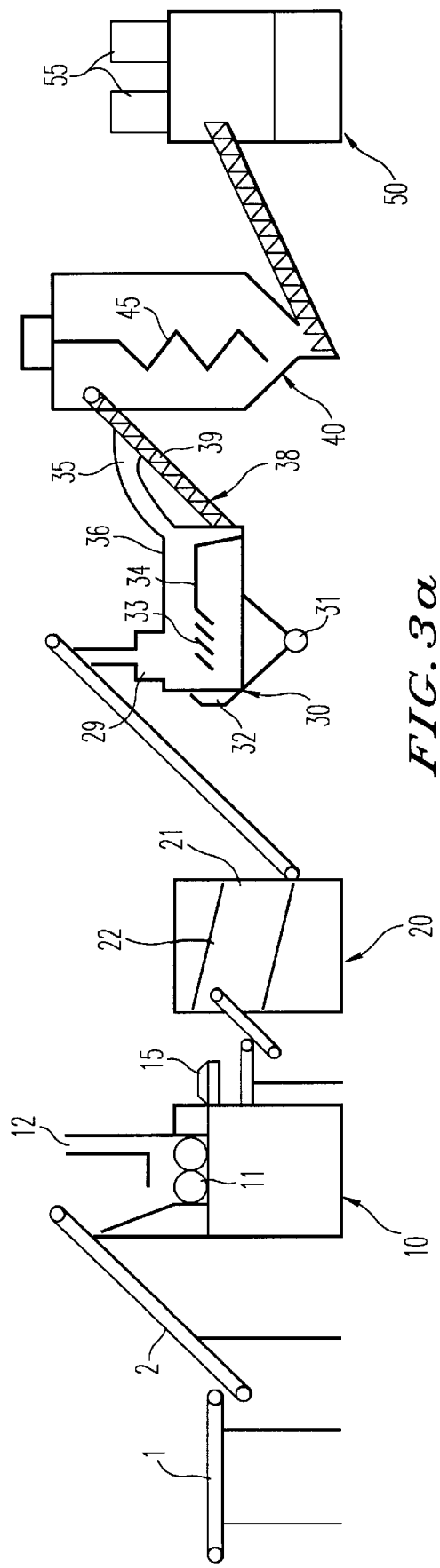
FIGS. 3a and 3b show an embodiment of the apparatus according to the invention, more particularly for carrying out the process according to FIG. 2.
Figure 3B:
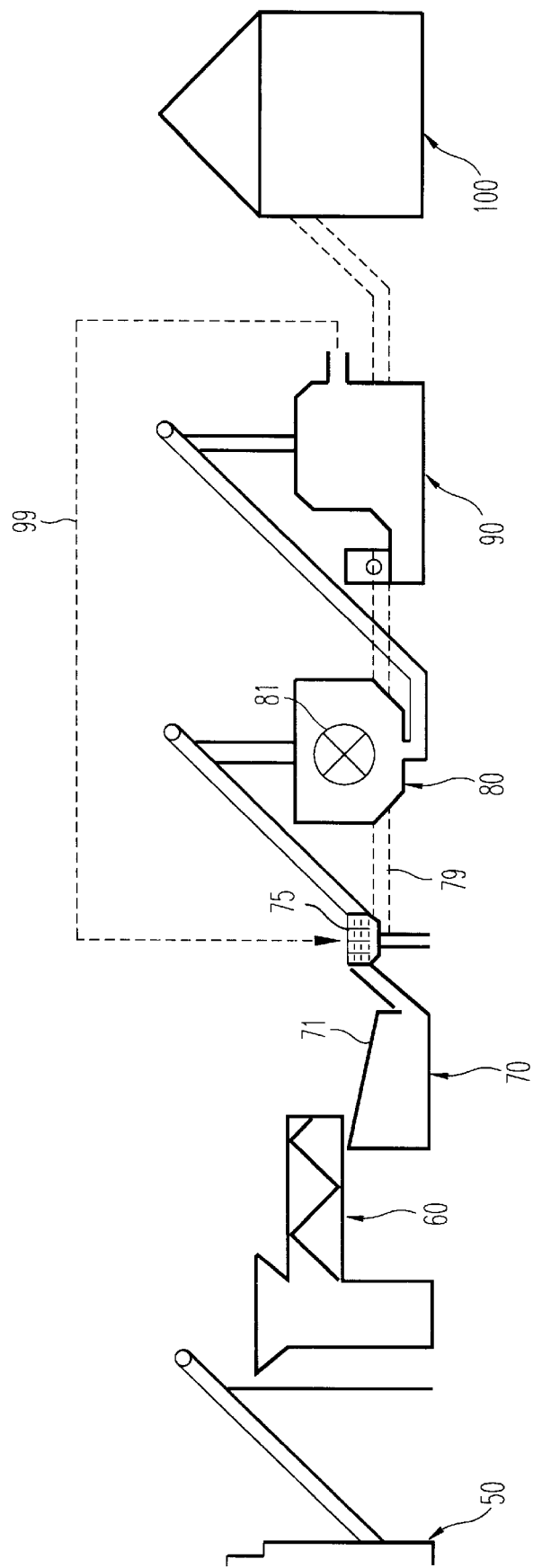

A reprocessing apparatus for carrying out the process according to FIG. 2 will now be explained with reference to FIG. 3. FIG. 3a shows the first part of the reprocessing apparatus more particularly the stages for preparing the material and the agglomerator, and FIG. 3b shows the second part of the reprocessing apparatus, more particularly the stages for finishing off the material and the storage silo. A more detailed description of the transport means (conveyor belts, screw conveyors, pneumatic conveyors and the like) between the individual reprocessing stages is omitted since the transport means are not on the basis of additional features (screen base, drying assembly) of significance per se for the material reprocessing.

The apparatus comprises as a first reprocessing stage a shredder (cutting roller shredder) 10. The shredder 10 is provided with a filling mechanism 12 with which the delivered material can be pressed onto the cutting rollers (11). Behind the shredder is an overhead belt magnet 15 for separating off the magnetic materials.

The next reprocessing stage consists of a rotary tube drier 20 which functions at the same time as a drum screen. For this the walls 22 of the drum 21 are provided with screen holes.

The third reprocessing stage forms a wind sifter 30 for separating off heavy constituent parts of the plastics mixture. In the wind sifter (aero classifier) the different movement pattern of the granular particles of different size and density in an air stream is used to remove substances having a large mass density out of the material to be reprocessed. The wind sifter 30 has at its front end a blower 32 with which an air stream is provided directed towards the rear end of the wind sifter 30. In order to guide the air stream guide plates 33 are provided inclined in the transport direction of the material. In the delivery area 29 of the wind sifter 30 there is a magnetic plate arranged in order to be able to direct magnetic substances out of the material introduced into the wind sifter 30. The outlet 31 serves to remove the fast sinking heavy constituent parts out from the wind sifter 30.

In the rear section of the wind sifter 30 the granular parts of the material being reprocessed collect on a screen plate 34 which is mounted substantially parallel to the air stream out of the blower 32 and which is designed as a vibrating screen. Granular particles with a diameter of less than 5 mm are thereby screened off as screen underflow and can be removed from the material to be reprocessed at the outlet 31.

The larger granular particles (screen overflow) pass on the vibrating screen 34 to the input of the scraper conveyor 38 lying in the lower area of the rear section of the wind sifter 30 and are moved by the scraper conveyor to the next reprocessing stage.

In the area above the vibrating screen 34 the hollow bodies, foil parts and the like are blown by the air stream from the blower 32 into the wind channel 35 which connects the wind sifter 30 to the central section of the scraper conveyor 38. Screen holes 36 arranged in the said upper area of the wind sifter 30 serve for relieving the pressure.

A comparable wind sifter is described in detail below with reference to FIG. 4.

The plastics mixture which has been shredded and cleared of the foreign substances can be temporarily stored in the buffer silo 40. To circulate the plastics mixture the buffer silo 40 is provided with a vertical screw 45. The buffer silo furthermore serves to control the flow of material into the agglomerator 50.

The agglomerator 50 has suction devices 55 with which volatile substances such as eg ash, steam and paper can be sucked off during agglomeration.

After the drying path and the fine particle screen there is a rod screen 70 for separating off the flux and coarse particles. The screen base 71 of the rod screen 70 is perforated so that the coarse grain particles of the agglomerated material (granules with a particle size of more than 20 mm) can be screened off as screen overflow.

The screen underflow output from the rod screen 70 is connected to a moving screen, eg a vibrating screen 75 or a drum or tumbler screen with which the agglomerated material is separated into a portion with granules of more than 8 mm particle size (screen overflow) and a portion with granules of less than 8 mm particle size (screen underflow). The screen underflow output consisting of granules with a particle size of less than 8 mm is connected directly by the conveyor belt 79 to the storage silo 100.

For granules having a particle size of more than 8 mm further reprocessing is provided for which the output of the screen overflow is connected to a vortex flow separator 80.

In the vortex flow separator 80 non-magnetic metals can be separated off from the plastics mixture by means of a rotating pole wheel 81. The non-metal output of the vortex flow separator 80 is connected to a grinder 90. The grinder 90 serves for further shredding the granules which have a particle size of more than 8 mm. As shown diagrammatically by the dotted line 99 in FIG. 3 the outlet of the grinder 90 is connected in turn with the vibrating screen 75 where the ground particles can be screened once more. With these measures it is ensured that in the storage silo 100 only granules which have a particle size of less than 8 mm are stored for further industrial re-use.

Alternatively the vortex flow separator 80 can also be mounted between the fine grain screen and the oversized grain screen 75, eg directly after the rod screen 70.

It will now be described how the process shown in FIG. 2 for reprocessing mixed plastics proceeds in the apparatus shown in FIG. 3.

By means of the conveyor belts 1, 2 the—where applicable previously shredded—mixed plastics refuse is fed into the shredder 10. In order to prevent problems of entry in the case of voluminous plastics parts of low weight, such as eg foils and hollow bodies since eg the hollow body is not seized but dances on the rotating rollers, the material to be reprocessed is pressed by the filling tool 12 onto the rotating rollers 11. The material to be reprocessed is cut up in the shredder 10 to a predetermined size, preferably 50 mm to 65 mm. The shredded material is discharged from the shredder onto the conveyor belt 19.

After the shredder 10 magnetic materials, more particularly ferro-magnetic substances, are separated out from the plastics refuse mixture by an overhead belt magnet 15.

The material which has been shredded and cleared of magnetic substances is conveyed into the rotary tube drier 20 where it is thermally dried. Through the rotation of the drum 21 the material is moved during drying so that dirt and inert particles adhering to same are released. Since the wall 22 of the drum 21 is provided with screen holes, during the drying process at the same time the fine grain particles with a particle size of less than 7 mm are screened off from the material to be reprocessed. This portion of fine particles contains inert substances such as eg sand grains, glass splinters etc which are not to be subjected to further reprocessing with the plastics since they would help to form ash for example during agglomeration.

Advantageously the waste heat which is produced when generating the specific current for the reprocessing apparatus using a diesel assembly is used for the thermal drying.

The material which has dried and is cleared of inert substances is then, to separate off the heavy material, introduced through the delivery area 29 into the wind sifter 30 and seized by the air stream which is produced by the blower 32. In the wind sifter (aero sorter) the different movement pattern of the granular particles of different size and density in an air current is used to remove substances having a greater density than PVC from the material being reprocessed. This relates on the one hand to heavy plastics and on the other to those foreign substances which were not able to be separated out in the processing stages up until now.

The heavy substances sink in the air stream prematurely to the bottom and are discharged at 31 out of the wind sifter. The lighter plastics reach the second end of the wind sifter 30. The granular portion collects on the vibrating screen 34 wherein granules with a particle size of less than 5 mm, thus more particularly the fine material rich in inert substances are screened off as screen underflow and discharged at 31. The screen overflow is transported on the vibrating screen to the scraper conveyor 38 and there is discharged from the wind sifter. The proportion of hollow bodies, foil parts and the like is carried by the air stream through the by-pass tube (wind channel 35) into the middle section of the scraper conveyor 38. The input area of the scraper conveyor 38 is thereby relieved and blockages and the formation of dust are thereby avoided.

Further details on the functioning of the wind sifter are explained below with reference to FIG. 4.

In the scraper conveyor 38 the material being reprocessed is conveyed by the scraper chain 39 into the buffer silo 40. In the buffer silo 40 the material is circulated round by means of the vertical screw 45 in order to prevent the formation of bridges and to homogenize the granular material. The buffer silo 40 furthermore serves to control the supply of material into the agglomerator 50. Defined amounts of the material being reprocessed can be fed into the agglomerator by buffering the discontinuous material flow into the buffer silo.

The plastics material is melted in the agglomerator 50 whereby the agglomeration process is started. The material is then suddenly cooled down. The aim of agglomeration is to control the loose pile parameters of the material being processed so that the particle size distribution is more even, the granular shape is more uniform and the bulk density is increased. With the non-solid plastics constituent parts such as foils, containers etc mainly contained in household refuse, agglomeration leads to a more compact shape of reduced size. Overall a uniform free-flowing granulate is to be produced which can be conveyed, metered and recycled more easily.

With the process according to the invention it is of particular importance that during agglomeration volatile substances, such as eg paper, ash and steam are sucked off through the suction devices 55. The concentration of these obstructive substances in the agglomerate is thereby considerably reduced.

The agglomerated material is thermally dried in the drying path 60 to the desired residual moisture (normally below 1%). During the drying process the fine grain portion of the agglomerated material (particles with a granular size of less than 1.6 mm) is screened off using a drum screen.

Experimental investigations have shown that this fine grain portion contains a large part of the paper, ash and other comparable substances contained in the agglomerated material. By screening off the fine grain portion therefore it is possible to once again substantially reduce the concentration of these substances in the agglomerate. By sucking off the volatile substances during agglomeration and by then screening off the fine grain portion the maximum limits demanded relating to ash are clearly understepped in the agglomerate.

After screening off the fine grain particles the rod screen 70 is used to screen off the coarse grain part (granules with a particle size of more than 20 mm) from the agglomerate. Through the successive screening off of first the fine grain particles and then the coarse grain particles there remains in the reprocessing process a plastics agglomerate which has a particle size of between 1.6 mm and 20 mm. This loose pile is characterised in particular through a small content of obstructive substances and is therefore particularly well suited for further recycling.

The loose pile is screened once more in the vibrating screen 75. The granules with a particle size of less than 8 mm form the screen underflow and are conveyed by the mechanical conveyor 79 into the storage silo 100. There they are kept ready for further industrial re-use.

The granules with a particle size of more than 8 mm (screen overflow) are fed into the vortex flow separator 80. In this the non-magnetic metals are removed from the agglomerate. In the vortex flow separator the agglomerate is exposed to an alternating magnetic field which is produced by the turning pole wheel 81. Vortex currents are thereby induced into the metal particles according to the Maxwell equations and the metal particles are thereby magnetized. This allows the metals to be separated off.

After separating off the non-magnetic metals the granules having a particle size of more than 8 mm are shredded in the grinder 90 which is loaded from the top. As can be seen by the dotted line 99 in FIG. 3 the ground material is moved out of the grinder 90 back again to the vibrating screen 75 where it is screened once more. Thus it is ensured that only granules having a particle size of less than 8 mm are moved into the storage silo 100.

The reprocessed agglomerate is stored in the storage silo 100 until it is fetched for further use. It can thereby be proposed that the reprocessed agglomerate during its removal from the storage silo 100 is examined once more for any remaining ferro-magnetic substances, more particularly iron and steel parts, eg with a magnetic separator.

Furthermore it is proposed that the substances separated out from the material to be reprocessed, more particularly ferro-magnetic substances, inert substances (glass, sand etc), heavy plastics parts, fine and oversized granules of the plastics agglomerate and the non-magnetic metals are each re-used separately.

The apparatus described allows the reprocessing of plastics refuse mixtures, more particularly of thermoplastics plastics from household collections of the German Dual System, in a pure dry process. With this reprocessing the concentration of obstructive substances, more particularly metals, ash, paper, sand and glass splinters is reduced insofar as for example the recycling of the agglomerate in extruders is readily possible. Also the particle size and loose bulk density of the agglomerate lie within the prescribed limits.

To sum up through the above described process a free flowing compact material is produced which has the quality required for the material recycling. No wet cleaning stages are used so that the very expensive and energy-sapping drying stages for wet plastics can be omitted. Further energy savings can be achieved by operating the apparatus with a power and heat coupling.

Figure 4:
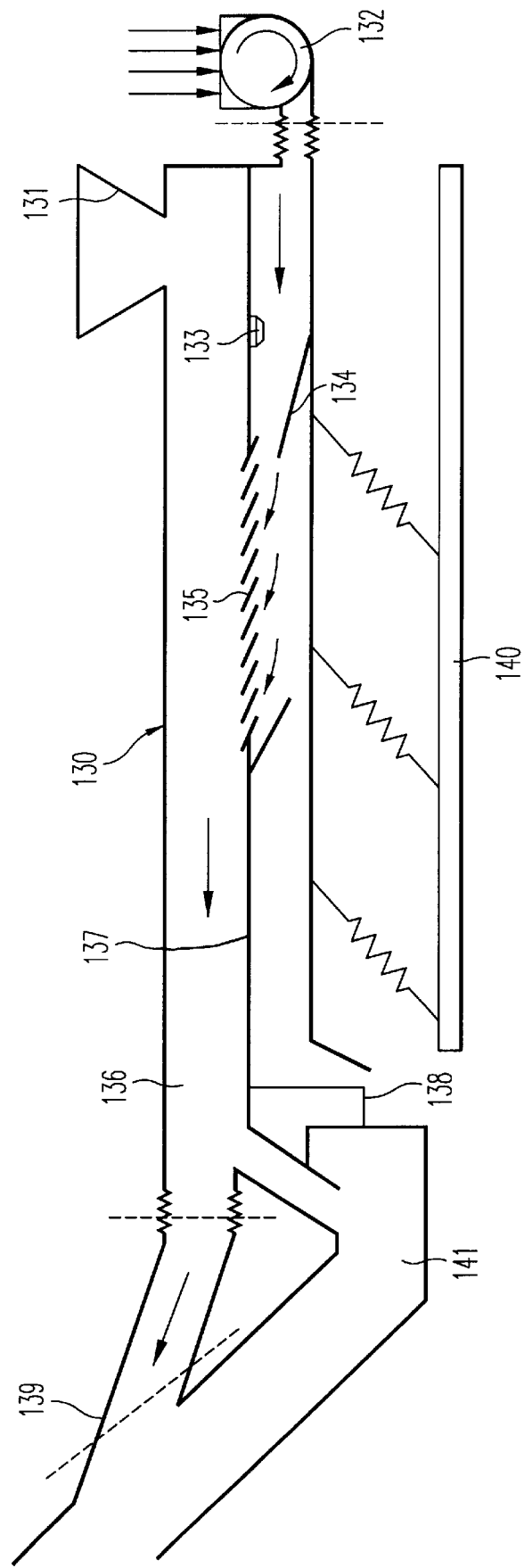
FIG. 4 shows an embodiment of a wind sifter for use in the apparatus according to the invention.

FIG. 4 shows a detailed principle sketch of a preferred embodiment of the wind sifter.

The material to be reprocessed is fed into this wind sifter 130 from above through the feeder 131 and then is guided by the air stream produced by the blower 132 past the magnets 133 (so-called "police magnets" for tracing and removing magnetic constituent parts still contained in the material) in the direction of the guide plates 134, 135. The wind guide plate 134 and the adjustable guide plates 135 serve to guide the air stream and material being reprocessed into the vibration channel 136. There the heavy particles sink prematurely to the ground and pass to the delivery shaft 138 for the heavy fraction. The lighter material passes opposite into the vibration channel 136.

The vibration channel 136 is set in vibration by the spring drive 140. In the rear area of the vibration channel the granular portion of the material being reprocessed collects on the base section 137 designed as the screen path. The openings of the screen path 137 are dimensioned so that granules with a particle size of less than 5 mm pass as screen underflow into the delivery shaft 138. The larger particles form the screen overflow and are removed from the wind sifter 130 by means of the scraper chain conveyor 141.

The vibration channel 136 is furthermore connected to the scraper chain conveyor 141 by the wide channel 139. Through this the foil parts and other particularly light constituent parts are blown directly into the middle area of the scraper chain conveyor 138.

Figure 5:
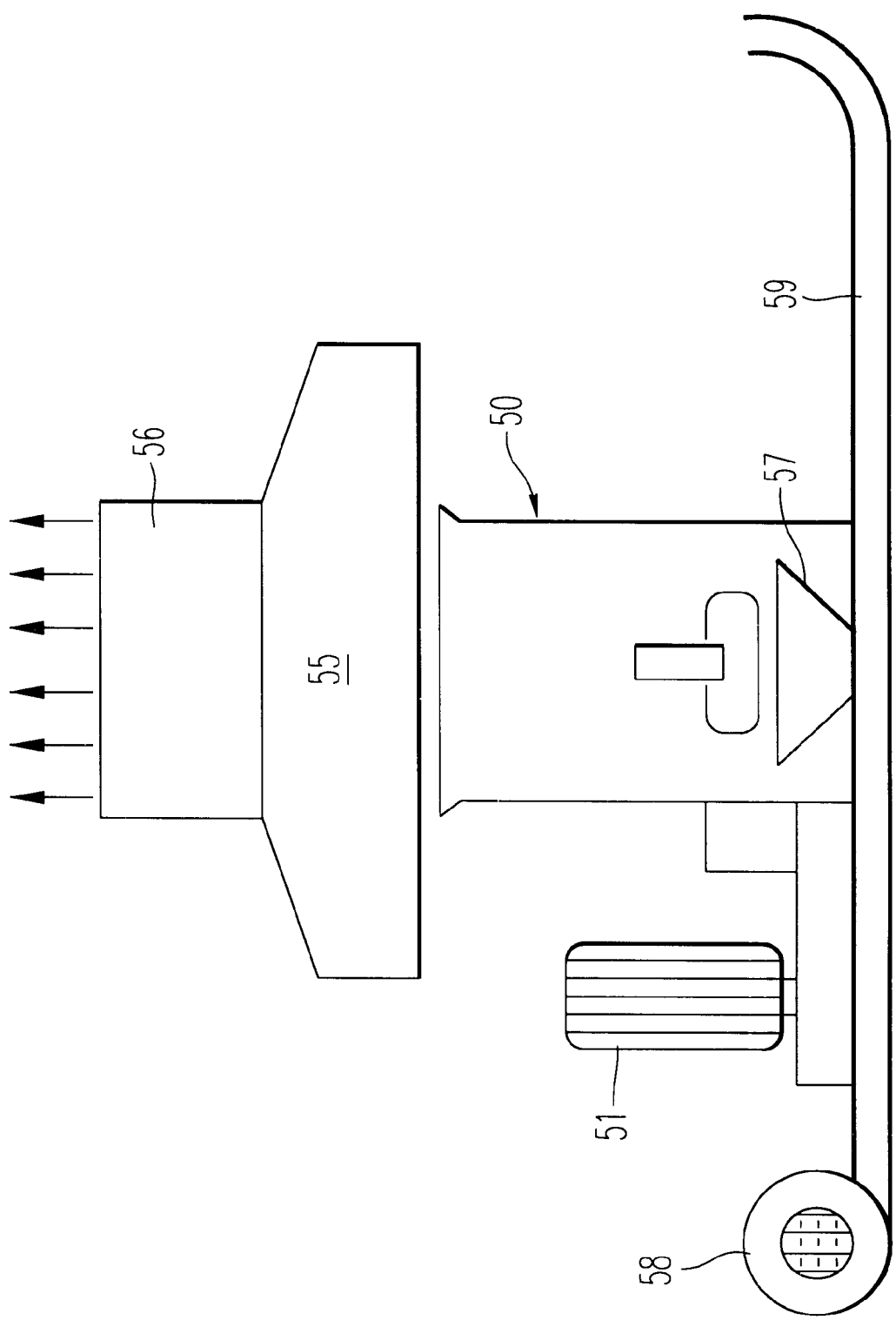
FIG. 5 shows an embodiment of an agglomerator for use in the apparatus according to the invention.

FIG. 5 shows a preferred embodiment of the agglomerator 50 with a drive motor 51. The agglomeration process starts therein and proceeds in known way by melting and then cooling the material being processed. Of special importance is here the suction bell 55 with which the volatile materials such as eg paper, ash, steam etc are sucked off during agglomeration. These substances pass through the output 56 into an inclined cleaning device. By sucking off the volatile substances the content of obstructive substances in the loose pile of plastics arising during agglomeration is decisively reduced.

Furthermore a delivery hopper 57 is mounted in the agglomerator 50. Through this the loose pile of plastics arising during agglomeration passes into the pneumatic conveyor path 59 where it is slid further along by the air stream produced by the ventilator 58 and dried.

Figure 6:
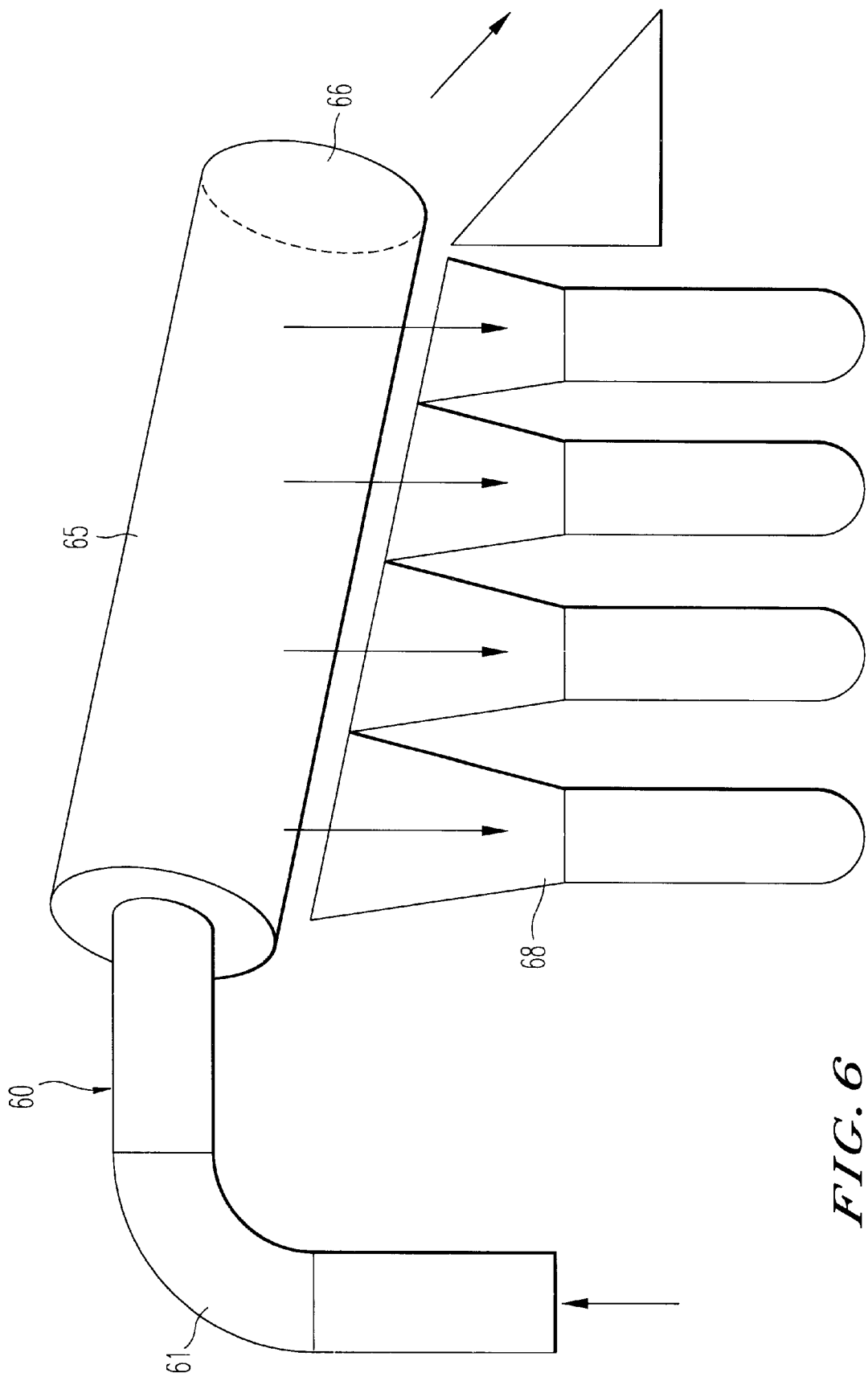
FIG. 6 shows an embodiment of a dry path with fine grain screen for use in the apparatus according to the invention.

FIG. 6 finally shows a preferred embodiment of a drying path 60 wherein a pneumatic conveyor path 61 is combined technologically with a fine grain screen 65 for the agglomerated material.

In the pneumatic conveyor path 61 the agglomerated material is directed to the drum screen 65 and is thereby dried. The material runs through the rotating drum screen 65 whose screen walls have a diameter such that particles with a size of less than 1.6 mm pass as screen underflow into the collecting container 68. The screen overflow is removed at the outlet 66 and passes to the next reprocessing stage.

If the fine grain screen 65 is mounted directly behind the agglomerator 50 then the pneumatic conveyor path 61 is the continuation of the pneumatic conveyor path 59 shown in FIG. 5 in which the material is removed from the agglomerator 50.

We claim:

1. A process for reprocessing mixed plastics from household refuse, wherein the material to be reprocessed is first shredded in a shredding stage and magnetic substances are removed from the shredded material, wherein:
   a) the shredded material is agglomerated by one of thermal agglomeration and agglomeration under pressure to first melt the material and then cool it down, while volatile substances contained in the material to be reprocessed are sucked off through suction devices;
   b) the agglomerated material is dried and
   c) the agglomerated material is screened.

2. Process according to claim 1 characterised in that the fine grain portion is screened off from the agglomerated material using a fine grain screen.

3. Process according to claim 1 characterised in that coarse grain particles are screened off from the agglomerated material using a coarse grain screen (70).

4. Process according to claim 1 characterised in that the material to be reprocessed is shredded in the shredding stage using a cutting roller shredder.

5. Process according to claim 4 characterised in that the material to be reprocessed is shredded in the shredder to a particle size of 50 mm.

6. Process according to claim 4 characterised in that in order to increase the material throughput in the shredding stage several shredders are operated in parallel.

7. Process according to claim 4 characterised in that the material to be reprocessed is pre-shredded prior to entering the shredder and that the pre-shredded material is rammed into the shredder using a filling tool.

8. Process according to claim 7 characterised in that after the preliminary shredding those constituent parts of the material being reprocessed which exceed a specific predetermined weight are sorted out in that the pre-shredded material is guided over a flap device whose mechanism is released in dependence on the weight bearing on same.

9. Process according to claim 7 characterised in that after the preliminary shredding magnetic substances are removed from the material being preprocessed by a magnetic separator before the material being reprocessed is passed into the shredding stage.

10. Process according to claim 1 characterised in that after the material to be reprocessed has been shredded in the shredding stage the magnetic substances are separated off using a magnetic separator, preferably an overhead belt magnet.

11. Process according to claim 1 characterised in that the shredded material is thermally dried in a rotary tube drier.

12. Process according to claim 1 characterised in that the material to be reprocessed is blown into a wind sifter in which substances which exceed a certain predeterminable mass density are sorted out from the shredded material.

13. Process according to claim 12 characterised in that the granular part of the light material to be reprocessed is removed from the wind sifter by a mechanical conveyor and that foil parts and the like are guided through a wind channel from the wind sifter into the central section of the mechanical conveyor.

14. Process according to claim 12 characterised in that in order to increase the material throughput the shredded material passes through several wind sifters and/or screen paths arranged in parallel.

15. Process according to claim 1 characterised in that inert substances are removed from the material which has been shredded and cleared of the magnetic substances in that the material is transported by a mechanical conveyor which is provided with a screen base.

16. Process according to claim 14 characterised in that granules with a particle size of less than 5 mm are screened off from the material being reprocessed over a screen path.

17. Process according to claim 1 characterised in that before it enters the agglomerator the material being reprocessed is homogenised through circulation in a buffer silo.

18. Process according to claim 1 characterised in that the material to be reprocessed is first melted in the agglomerator and then suddenly cooled down.

19. Process according to claim 1 characterised in that the agglomerated material is dried on a drying path to a certain predetermined residual dampness and that the fine grain portion of the agglomerated material is screened off using a drum screen.

20. Process according to claim 18 characterised in that drying is carried out on a pneumatic conveyor path.

21. Process according to claim 1 characterised in that the agglomerated material is dried to a residual dampness of less than 1%.

22. Process according to claim 1 characterised in that the fine grains with a particle size below 1.6 mm are screened out of the agglomerated material.

23. Process according to claim 1 characterised in that coarse grains and flux are screened out of the agglomerated material by a rod screen.

24. Process according to claim 1 characterised in that in order to screen off the coarse grain particles the granules with a particle size of more than 20 mm are removed from the agglomerated material.

25. Process according to claim 1 characterised in that the non-magnetic metals (non-ferrous metals) are separated out by a vortex flow separator.

26. Process according to claim 1 characterised in that the oversized grain portion of the material remaining in the process, more particularly the granules with a particle size of more than 8 mm is screened out with a moving screen and shredded once more using a grinder.

27. Process according to claim 1 characterised in that the mixed plastics are reprocessed in the following stages:
   a) Shredding of mixed plastics with a shredder, preferably to a particle size of 50 mm to 65 mm;
   b) Separating off magnetic materials with a magnetic separator;
   c) Thermal drying of the material to be reprocessed in a rotary tube drier;
   d) Screening off the fine grain portion with a particle size of less than 7 mm, with a drum screen;
   e) Separating off heavy material with a wind sifter;
   f) Screening off the fine grain portion with a particle size of less than 5 mm on a screen path;
   g) Storage and homogenization of the material to be reprocessed in a buffer silo;
   h) Agglomerating the material to be reprocessed in an agglomerator wherein volatile substances are sucked off with the aid of suction devices;
   i) Drying of the agglomerated material on a drying path;
   j) Screening off the fine grain portion having a particle size of less than 1.6 mm with a drum screen;
   k) Screening off the coarse grain portion with a particle size of more than 20 mm, with a rod screen;
   l) Screening off the granules with a particle size of more than 8 mm with a vibrating screen wherein the larger particles form the screen overflow and the smaller particles form the screen underflow;
   m) Conveying the screen underflow from step l) into a storage silo;
   n) Separating non-magnetic metals out from the screen overflow of step l) with a vortex flow separator shredding the screen overflow with a cutting grinder and renewed delivery of shredded material onto vibrating screen.

28. Process according to claim 1 characterised in that the substances removed from the material being reprocessed, including the magnetic and non-magnetic metals, the inert substances, the heavy plastics and the screened-off fine grain and oversized grain particles are each stored separately for further re-use.

29. Process according to claim 1 characterised in that the energy required to operate the reprocessing apparatus, including the energy required for drying is produced through power and heat coupling.

30. An apparatus for reprocessing mixed plastics comprising:
   a shredding stage for shredding the material to be reprocessed;
   a magnetic separator for removing magnetic substances from the shredded material;
   an agglomerator for agglomerating the shredded material to first melt the material and then cool it down;
   a suction device for sucking off volatile substances during agglomeration;
   a drying path for drying the agglomerated material; and
   a fine grain screen for screening off the fine grain portion from the agglomerated material.

31. Apparatus according to claim 30 characterised by a coarse grain screen connected on the output side of the agglomerator for screening off the oversized grain portion of the agglomerated material.

32. Apparatus according to claim 30 characterised by a wind sifter connected on the output side of the shredding stage to separate the heavy material out from the shredded material.

33. Apparatus according to claim 32 characterised in that the wind sifter has in its rear section remote from the blower a screen path (34), more particularly a vibrating screen which is mounted substantially parallel to the air stream from the blower whereby the rear section of the wind sifter is divided into an upper and lower area, that adjoining this lower area there is a scraper conveyor and that a wind channel connects the upper area with the central section of the scraper conveyor.

34. Apparatus according to claim 30 characterised by a buffer silo which has a vertical screw for circulating the stored material and whose outlet is connected to the agglomerator.

35. Apparatus according to claim 30 characterised in that the fine grain screen for screening off the fine grain particles from the agglomerated material is designed as a drum screen and is mounted in the drying path for drying the agglomerated material.

36. Apparatus according to claim 30 characterised by a vortex flow separator connected on the output side of the agglomerator and the drying path.

37. Apparatus according to claim 30 characterised by the apparatus parts listed below and connected together by transport means, namely:

a) a shredder with filling tool whose outlet is connected to the feeder of a rotary tube drier;

b) an overhead belt magnet mounted behind the shredder;

c) a rotary tube drier whose wall is provided with screen holes and whose output is connected to the feeder of a wind sifter;

d) a wind sifter whose light material outlet is connected to the inlet of a buffer silo (40);

e) a buffer silo which has a vertical screw and whose outlet is connected to the agglomerator;

f) an agglomerator which has suction devices for sucking off volatile substances during agglomeration and whose output is connected to a drying path;

g) a drying path in which a drum screen is mounted for screening off the fine grain particles from the agglomerated material and which leads to a rod screen;

h) a rod screen whose screen underflow outlet is connected to a vibrating screen;

i) a vibrating screen whose screen underflow outlet is connected to a storage silo and whose screen overflow outlet is connected to a vortex flow separator;

j) a vortex flow separator whose non-metal outlet is connected to a cutting grinder;

k) a cutting grinder whose outlet is connected to the vibrating screen;

l) a storage silo.

* * * * *